(12) United States Patent
Liu et al.

(10) Patent No.: US 9,201,229 B2
(45) Date of Patent: Dec. 1, 2015

(54) PHOTO-SENSOR TYPE TOUCH DEVICE AND LIGHT MODULE AND OPTICAL LENS FOR THE PHOTO-SENSOR TYPE TOUCH DEVICE

(75) Inventors: Hua-Tang Liu, Taichung (TW); Ching-Shiang Wang, Taichung (TW)

(73) Assignee: ASIA OPTICAL CO. INC., Tortola (VG)

( * ) Notice: Subject to any disclaimer, the term of this patent is extended or adjusted under 35 U.S.C. 154(b) by 484 days.

(21) Appl. No.: 13/607,161

(22) Filed: Sep. 7, 2012

(65) Prior Publication Data

US 2013/0002612 A1 Jan. 3, 2013

Related U.S. Application Data

(63) Continuation-in-part of application No. 13/109,796, filed on May 17, 2011, now Pat. No. 8,708,527.

(51) Int. Cl.
*F21V 5/04* (2006.01)
*G02B 19/00* (2006.01)
*G02B 27/09* (2006.01)

(52) U.S. Cl.
CPC .......... *G02B 19/009* (2013.01); *G02B 19/0014* (2013.01); *G02B 19/0052* (2013.01); *G02B 27/0966* (2013.01)

(58) Field of Classification Search
CPC ............ G02B 19/009; G02B 19/0014; G02B 19/0052; G02B 27/0966
See application file for complete search history.

(56) References Cited

U.S. PATENT DOCUMENTS 3,267,279 A * 8/1966 Doolittle ....................... 362/268

* cited by examiner

*Primary Examiner* — Thomas M Sember
(74) *Attorney, Agent, or Firm* — Tracy M Heims; Apex Juris PLLC.

(57) ABSTRACT

A photo-sensor type touch device includes a screen, two light modules, a sensor, and a calculating unit. The screen has a displaying region to show images thereon. The light module emits linear invisible light to the displaying region. The invisible light is substantially perpendicular to a normal of the displaying region. The sensor senses a change of the invisible light on the displaying region when an object approaches the displaying region, and sends a signal out. The calculating unit is electrically connected to the sensor to receive the signal and calculate the signal to obtain a location of the object on the displaying region.

8 Claims, 12 Drawing Sheets

PHOTO-SENSOR TYPE TOUCH DEVICE AND LIGHT MODULE AND OPTICAL LENS FOR THE PHOTO-SENSOR TYPE TOUCH DEVICE

BACKGROUND OF THE INVENTION

1. Field of the Invention

The present invention relates generally to an optical device, and more particularly to an photo-sensor type touch device, and a light module and an optical lens for the photo-sensor type touch device.

2. Description of the Related Art

In present days, the touch panels and the touch systems, which provide user to operate image directly, are more and more popular in the market. Typically, there are two types of touch panels in the present market, resistive touch panels and capacitive touch panels. For a resistive touch panel, a pressure of finger touching the screen may cause a change of resistance to identify the location of the finger on the screen. However, the screen must be made of a flexible material that the surface of the screen will be worn and scratched for a time of use, and the speed of sense will slow down when one keeps pressing the same place. For a capacitive touch panel, it senses the natural current in human body when one touches the screen to identify the location of finger on the screen. However, the capacitive touch panel will not work when one wears glove or touches the screen by fingernail.

Recently, a new touch panel, photo-sensor type touch panel, is provided in the market. As shown in FIG. 1, a photo-sensor type touch panel is provided with two reflectors 110 to reflect laser rays of laser modules 120 crossing a screen 130 to be received by receivers 140. When one touches the screen 130 to block some laser rays, the specific receivers 140 will not receive the laser rays to identify the location of the finger. FIG. 2 shows another photo-sensor type touch panel, which has two micro-electromechanical systems (MEMS) to swing MEMS mirrors 210 to reflect linear laser rays of laser module 220 crossing a screen 230 to be received by receivers 240. For the same principle, when one touches the screen 230 to block some laser rays, the specific receivers 240 will not receive the laser rays to identify the location of the finger.

However, the photo-sensor type touch panel still has the following drawbacks:

1. It needs a space for the MEMS mirrors 210 and the MEMS that the photo-sensor type touch panel usually has a big size.

2. The MEMS is very expense, and it needs time to bootup that it slows down the time of sense of the photo-sensor type touch panel.

3. The use of the MEMS mirrors needs the laser of great power that photo-sensor type touch panel needs more power.

In order to overcome the above drawbacks, an improved light module for the photo-sensor type touch panel, which provides a linear light without the MEMS mirrors, is provided. As shown in FIG. 3, Taiwan patent no. 1323769 taught such light module including an optical lens 300 and a lamp 330. The optical lens 300 includes a light collector 310 and a lenticular lens array 320 with a waved surface. 1323769 taught that such light module may be incorporated in street lamp or other types of lamp. However, the lamp 330 emits light to the light collector 310 and the lenticular lens array 320 in sequence to emit a parallel and linear light, as shown in FIG. 4, which just meets the requirement of the photo-sensor type touch panel. However, the light module of 1323769 still has some drawbacks. The light from the lamp 330 will be converted into parallel light by the light collector 310, and all of the parallel light will be reflected by the lenticular lens array 320 at a time. Therefore, the light couldn't get a better diffusion. In addition, the lenticular lens array 320 can't provide the light with a better diffusion as well because the crests and the troughs of the waved surface will concentrate the light.

In conclusion, the conventional light modules and the optical lens still have some places to be improved.

SUMMARY OF THE INVENTION

The primary objective of the present invention is to provide a photo-sensor type touch device, and a light module and an optical lens for the photo-sensor type touch device, which converts light into parallel and linear light without the MEMS mirrors to speed up bootup time and reaction time, reduce the size and weight, and save the power.

According to the primary objective of the present invention, a photo-sensor type touch device includes a screen, two light modules, a sensor, and a calculating unit. The screen has a displaying region to show images thereon. The light module emits linear invisible light to the displaying region. The invisible light is substantially perpendicular to a normal of the displaying region. The sensor senses a change of the invisible light on the displaying region when an object approaches the displaying region, and sends a signal out. The calculating unit is electrically connected to the sensor to receive the signal and calculate the signal to obtain a location of the object on the displaying region.

In an embodiment, the light module includes a light source and an optical lens. The light source emits light to the optical lens. The light source has a parallelizing surface, a first plane, a wave surface, and a second plane in sequence. The light from the light source enters the optical lens via the parallelizing surface and leaves the optical lens via the first plane, and then the light enters optical lens again via the wave surface and leaves the optical lens via the second plane to form the linear light.

In an embodiment, the light module includes a light source and an optical lens. The light source emits light to the optical lens. The light source has a first plane, a parallelizing surface, a wave surface, and a second plane in sequence. The light from the light source enters the optical lens via the first plane and leaves the optical lens via the parallelizing surface, and then the light enters optical lens again via the wave surface and leaves the optical lens via the second plane to form the linear light.

In an embodiment, the wave surface has flat portions at crests and troughs thereof.

In an embodiment, the parallelizing surface has a convex surface.

In an embodiment, a sensing range of the sensor covers the entire display region.

Therefore, the light module of the present invention will speed up the bootup time and reaction time of the photo-sensor type touch device equipped with the light module, and the photo-sensor type touch device may be thinner and lighter than the conventional devices, and furthermore, it saves power.

DETAILED DESCRIPTION OF THE INVENTION

The detailed description and technical contents of the present invention will be explained with reference to the accompanying drawings.

Figure 1:
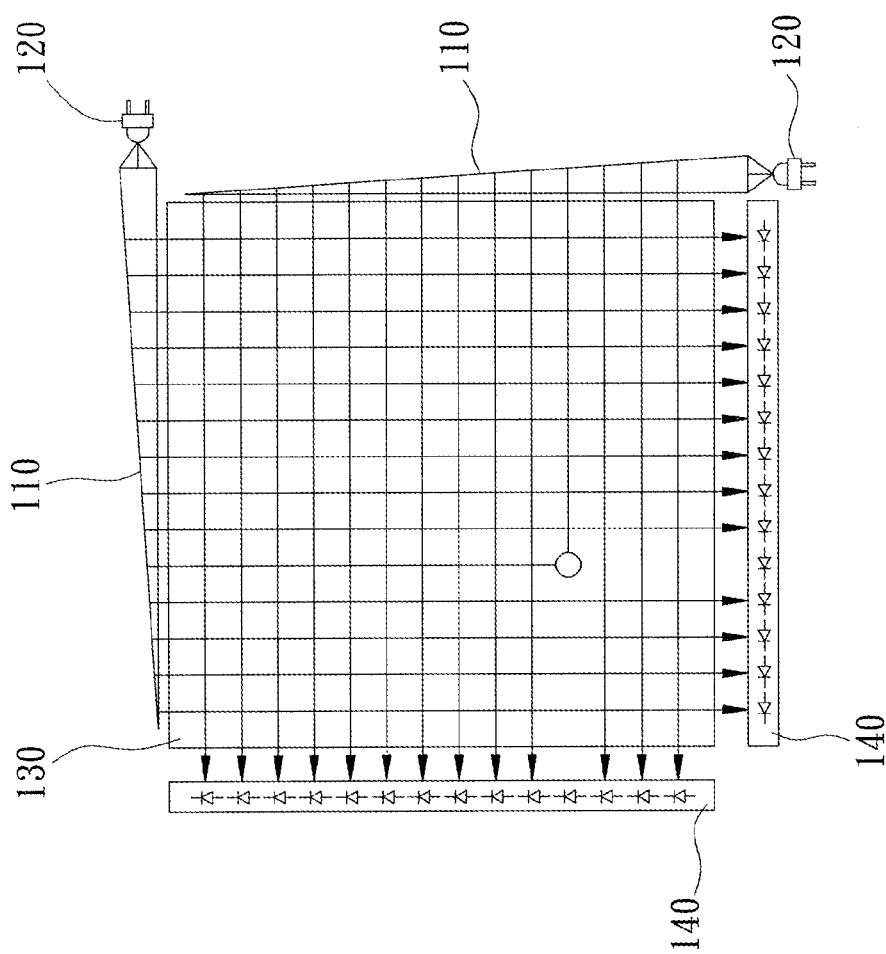
FIG. 1 is a sketch diagram of the conventional photo-sensor type touch panel.
Figure 2:
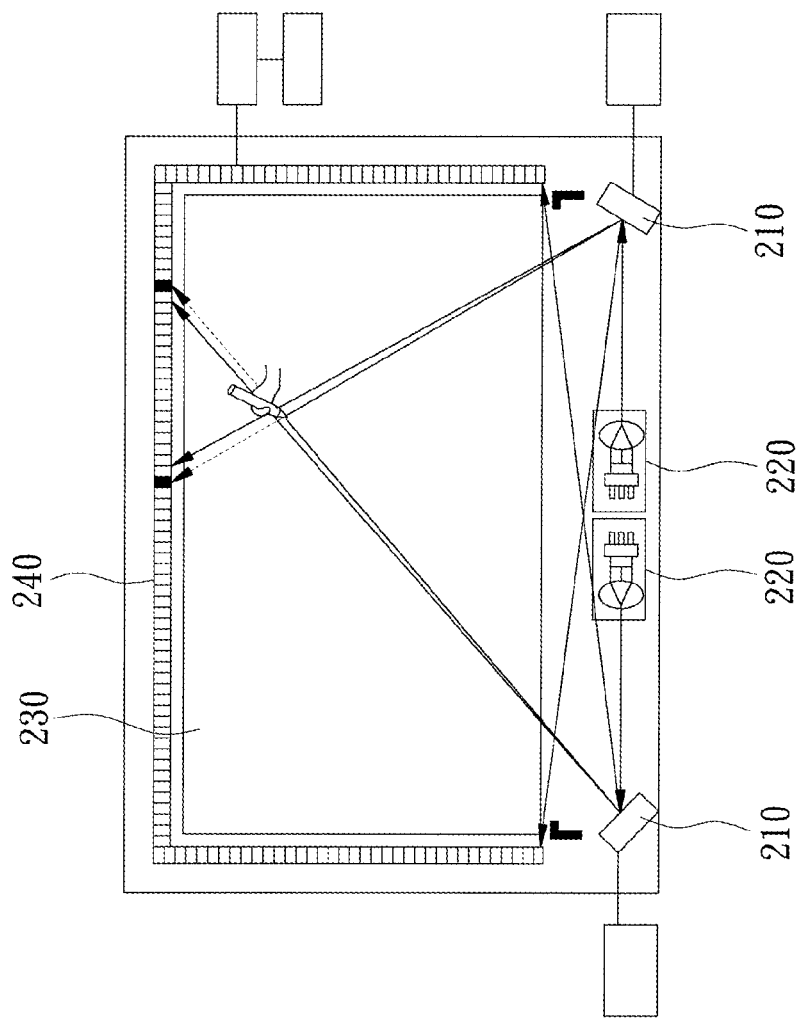
FIG. 2 is a sketch diagram of another conventional photo-sensor type touch panel.
Figure 3:
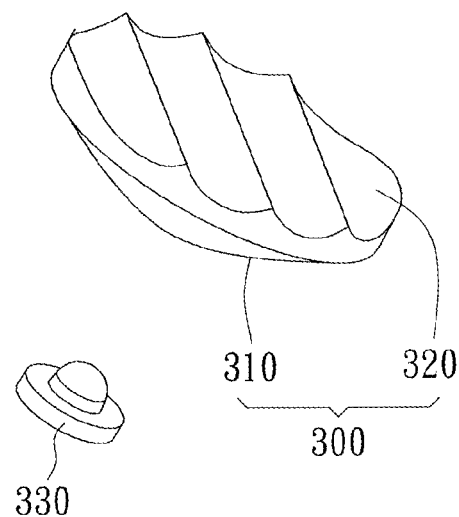
FIG. 3 is a perspective view of the conventional light module to emit linear light.
Figure 4:
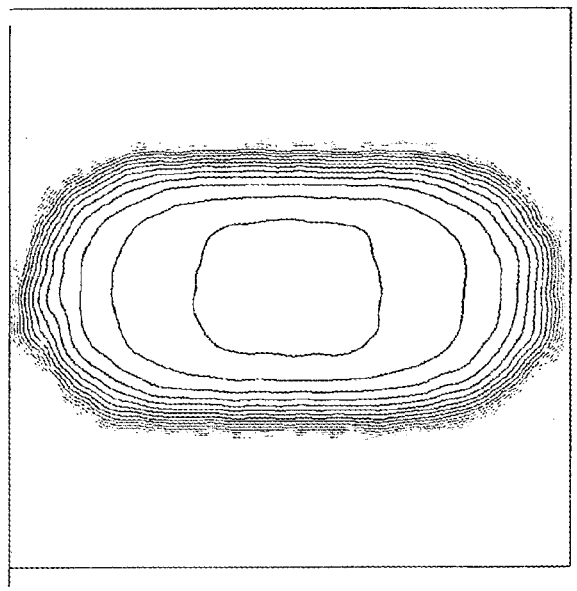
FIG. 4 is an illumination map of the conventional light module shown in FIG. 3.
Figure 5:
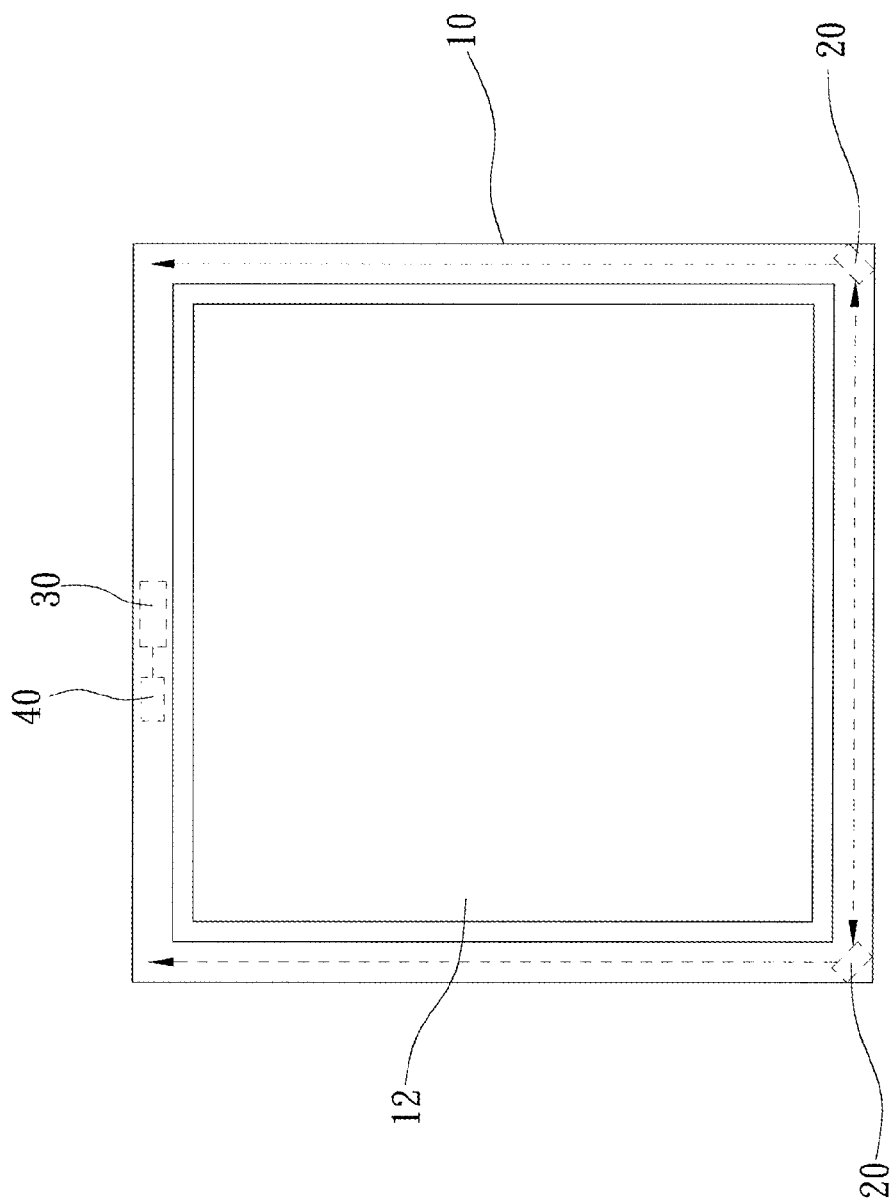
FIG. 5 is a sketch diagram of the photo-sensor type touch device of a preferred embodiment of the present invention.

As shown in FIG. 5, a photo-sensor type touch device of the preferred embodiment of the present invention includes a screen 10, two light modules 20, a sensor 30, and a calculating unit 40.

The screen 10 has a displaying region 12 to show images. In the present embodiment, the screen 10 is a liquid crystal display. It is obviously, the screen 10 may any kind of display which shows images in a predetermined region, such as projector and rear-projection television.

The light modules 20 are provided on the screen 10 beyond the displaying region 12 to emit invisible light to the displaying region 12. The invisible lights from the light modules 20 substantially are perpendicular to a normal of the displaying region 12. In the present embodiment, the light modules 20 emit infrared rays, and the light modules 20 are mounted at two bottom corners of the displaying region 12. It is obviously that the light modules 20 may be mounted at any other positions, and the number of the light modules 20 may be one, three, or more.

Figure 6:
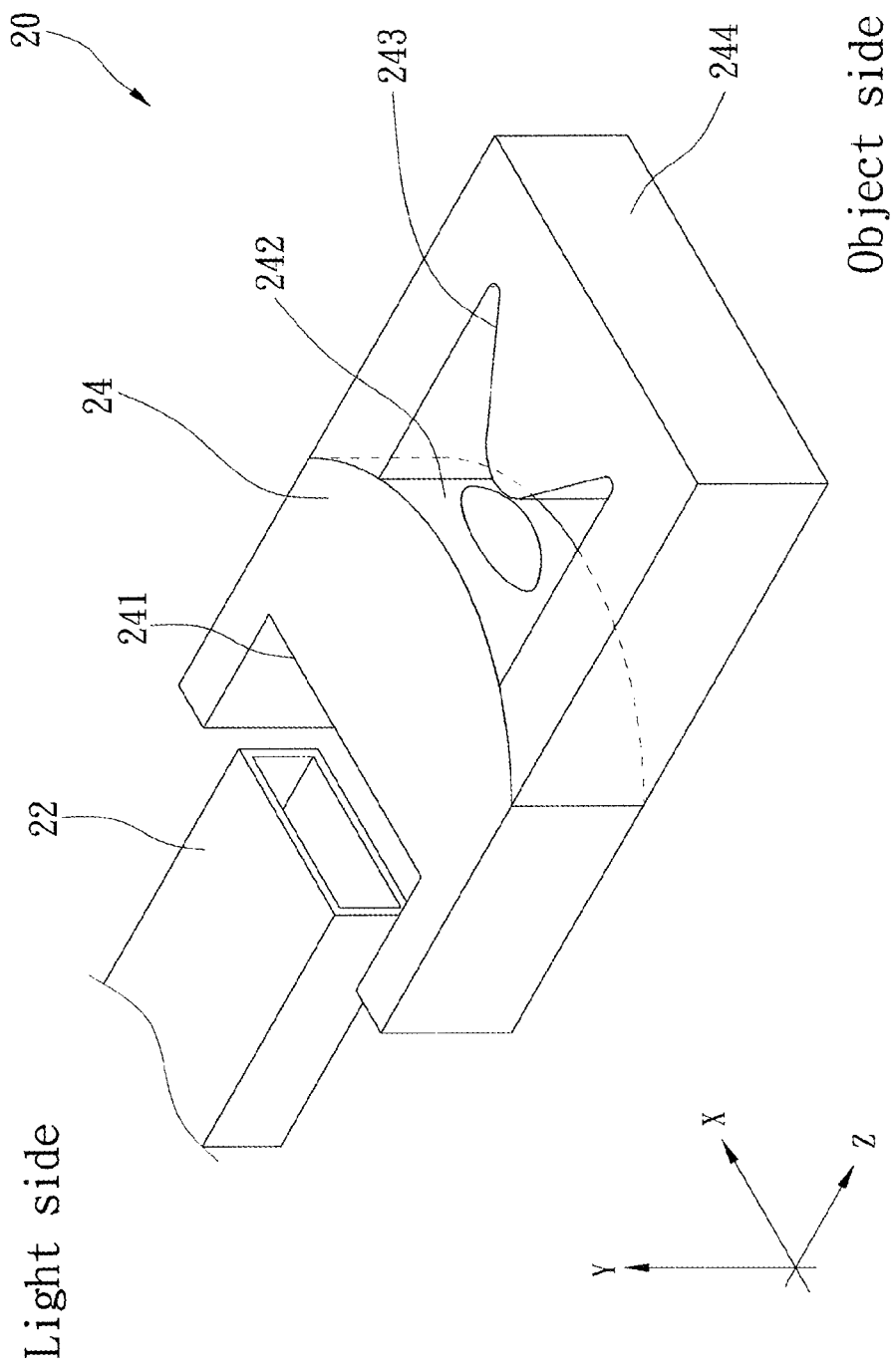
FIG. 6 is a perspective view of the light module of the photo-sensor type touch device of the preferred embodiment of the present invention.

As shown in FIG. 6, each light module 20 includes a light source 22 and an optical lens 24 along an optical axis from a light side to an object side. In the present embodiment, the light source 22 is an infrared ray laser emitting device to emit infrared rays toward the object side. It also may be LED, lamp, bulb, or other light emitting devices. The optical lens 24 has a first plane 241, a parallelizing surface 242, a wave surface 243, and a second plane 244 in sequence from the light side to the object side. The parallelizing surface 242 is a convex surface. The wave surface 243 has smooth portions at crests and troughs. In the present embodiment, the optical lens 24 is formed by two lenses. It is obviously that the optical lens 24 may be a single element.

Figure 7:
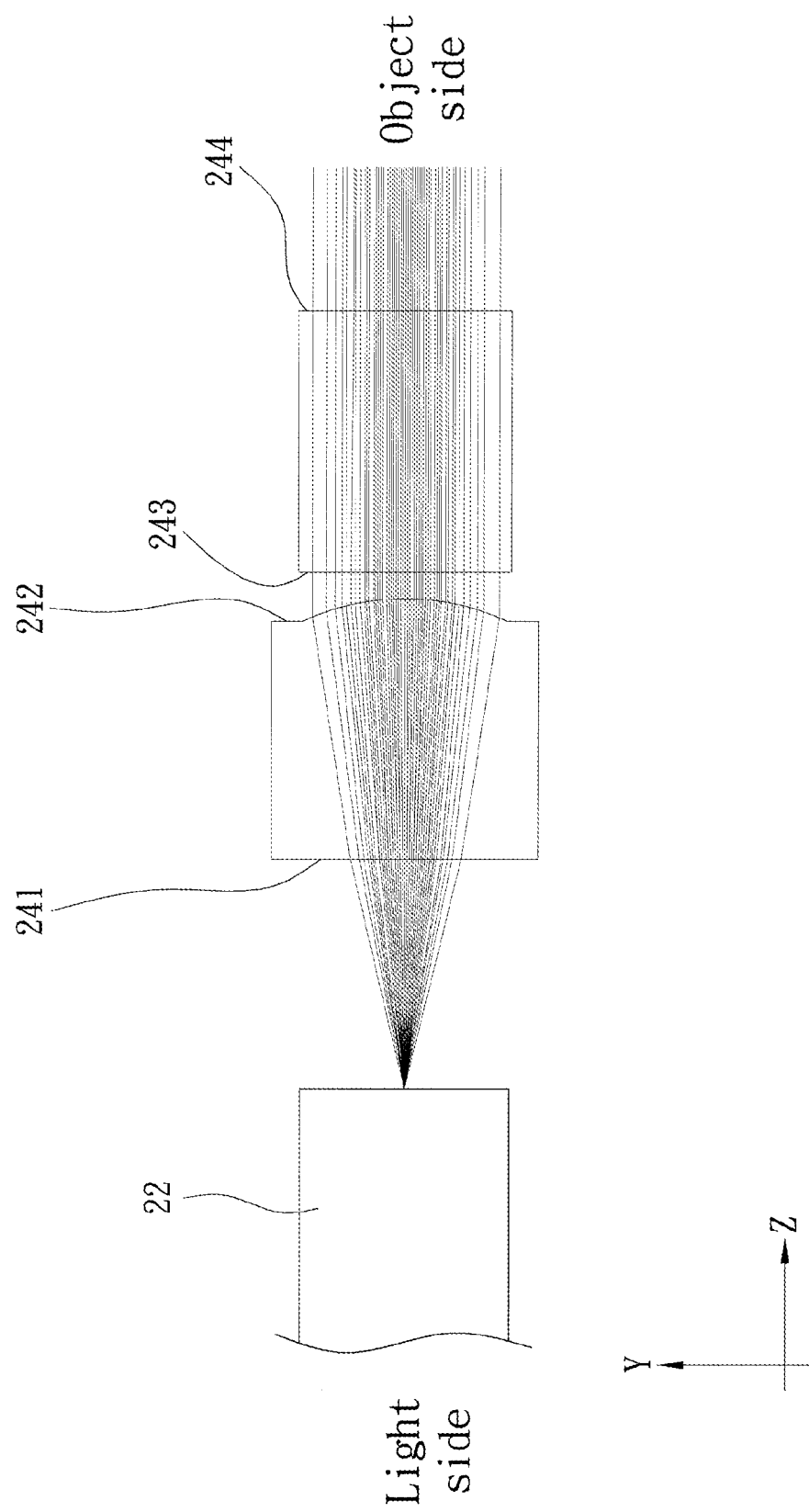
FIG. 7 is a sectional view in Y-Z plane and the light path of the preferred embodiment of the present invention.
Figure 8:
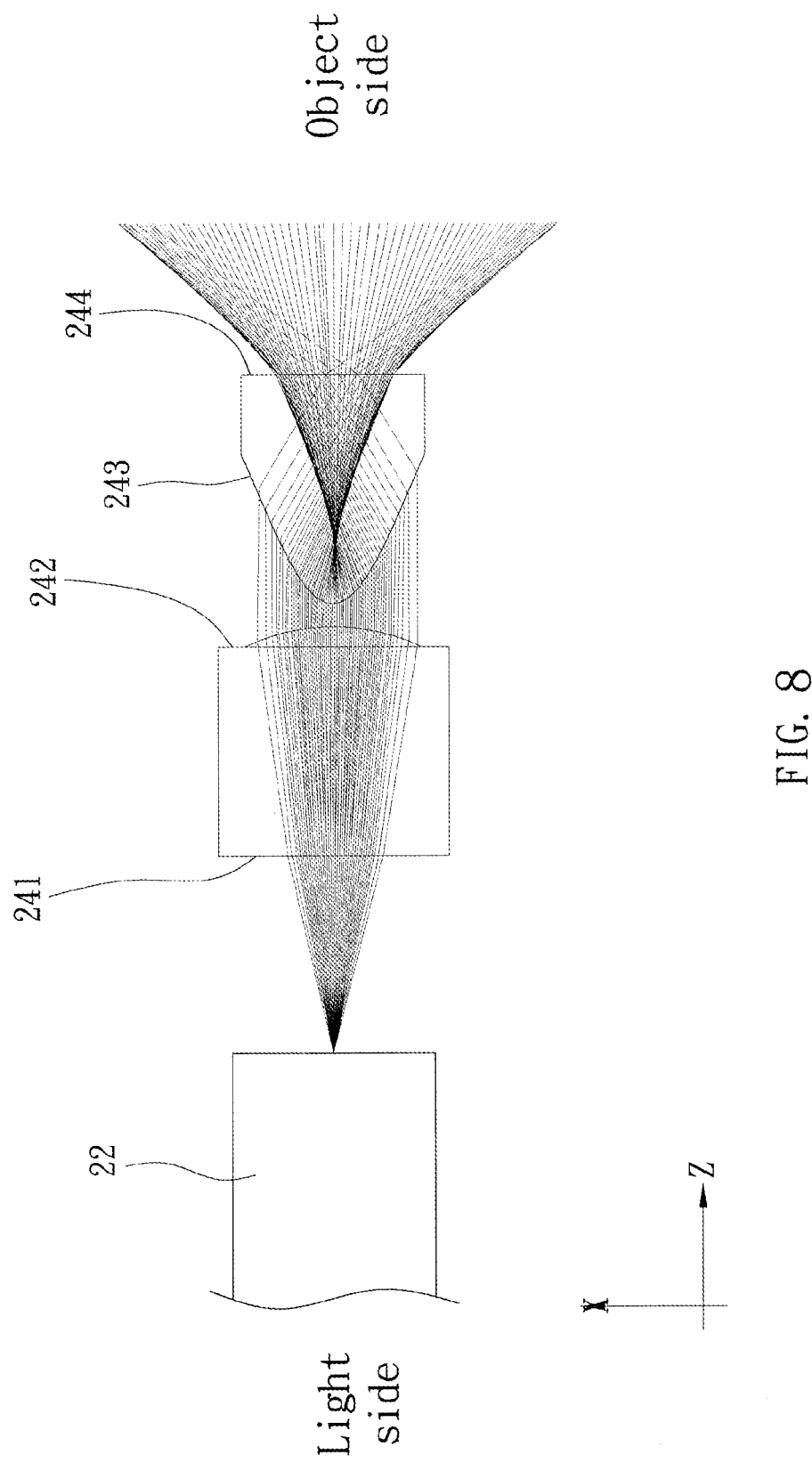
FIG. 8 is a sectional view in X-Z plane and the light path of the preferred embodiment of the present invention.
Figure 9:
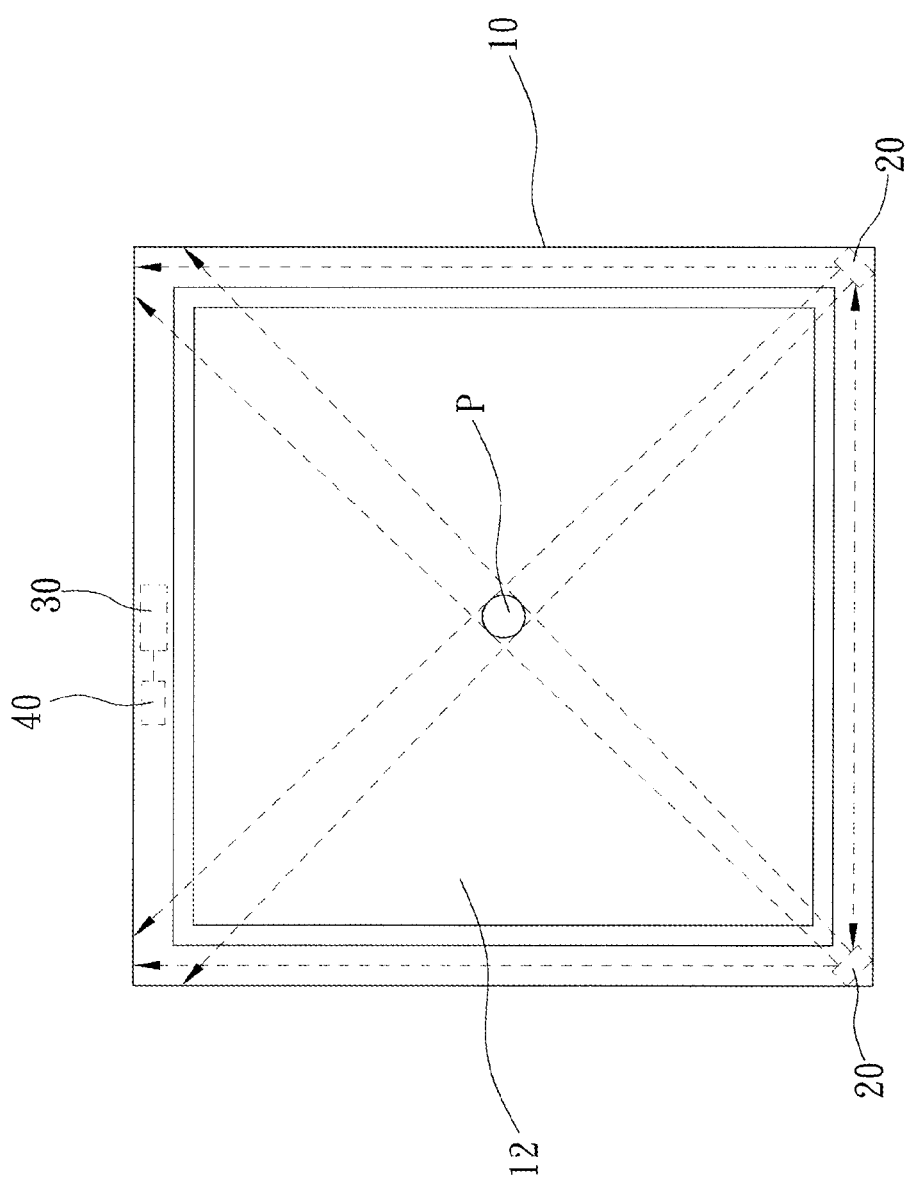
FIG. 9 is a sketch diagram of the photo-sensor type touch device of the preferred embodiment of the present invention, showing the light path when an object approaches the screen.

When the light source 22 emits infrared rays, as shown in FIG. 7 and FIG. 8, the infrared rays is converted into parallel light when it passes through the first plane 241 and the parallelizing surface 242, and the parallel light is converted into linear light when it passes through the wave surface 243 and the second plane 244. The infrared rays will be refracted at least twice when it passes through the first plane 241, the parallelizing surface 242, the wave surface 243, and the second plane 244 in sequence. A diffusing angle of the light through the optical lens 24 of the present invention is greater than ninety degrees, and the light is linear. Therefore, as shown in FIG. 9, when an object, such as finger or pen, approaches the displaying region 12, the light source 22 will emit infrared rays to the object and form at least a spot P on the object.

The sensor 30 is beyond the displaying region 12 to sense the invisible lights of the light modules 20. The sensor 30 will send a signal out when it senses a change of the invisible light. In the present embodiment, the sensor 30 is an infrared ray camera to monitor the entire displaying region 12 and to sense the spot P above displaying region 12.

The calculating unit 40 is electrically connected to the sensor 30 to receive the signal from the sensor 30 and calculate it to obtain a location of the spot P on the displaying region 12 accordingly. The calculating unit 40 also may change the image according to the sensed spot P or a moving path of the sensed spot P.

The advantages of the photo-sensor type touch device of the present invention include:

1. There is no MEMS and mirror in the light module that may speed up the time of bootup and reaction.

2. The light module 20 of the present invention has a small size and may emit thin parallel linear light that the photo-sensor touch panel incorporated with the light module 1 of the present invention may be made thinner and smaller.

3. The light source 22 only needs to provide the laser with regular power because there is no MEMS mirror involved that the photo-sensor touch panel incorporated with the light module 1 of the present invention may save more power.

Figure 10:
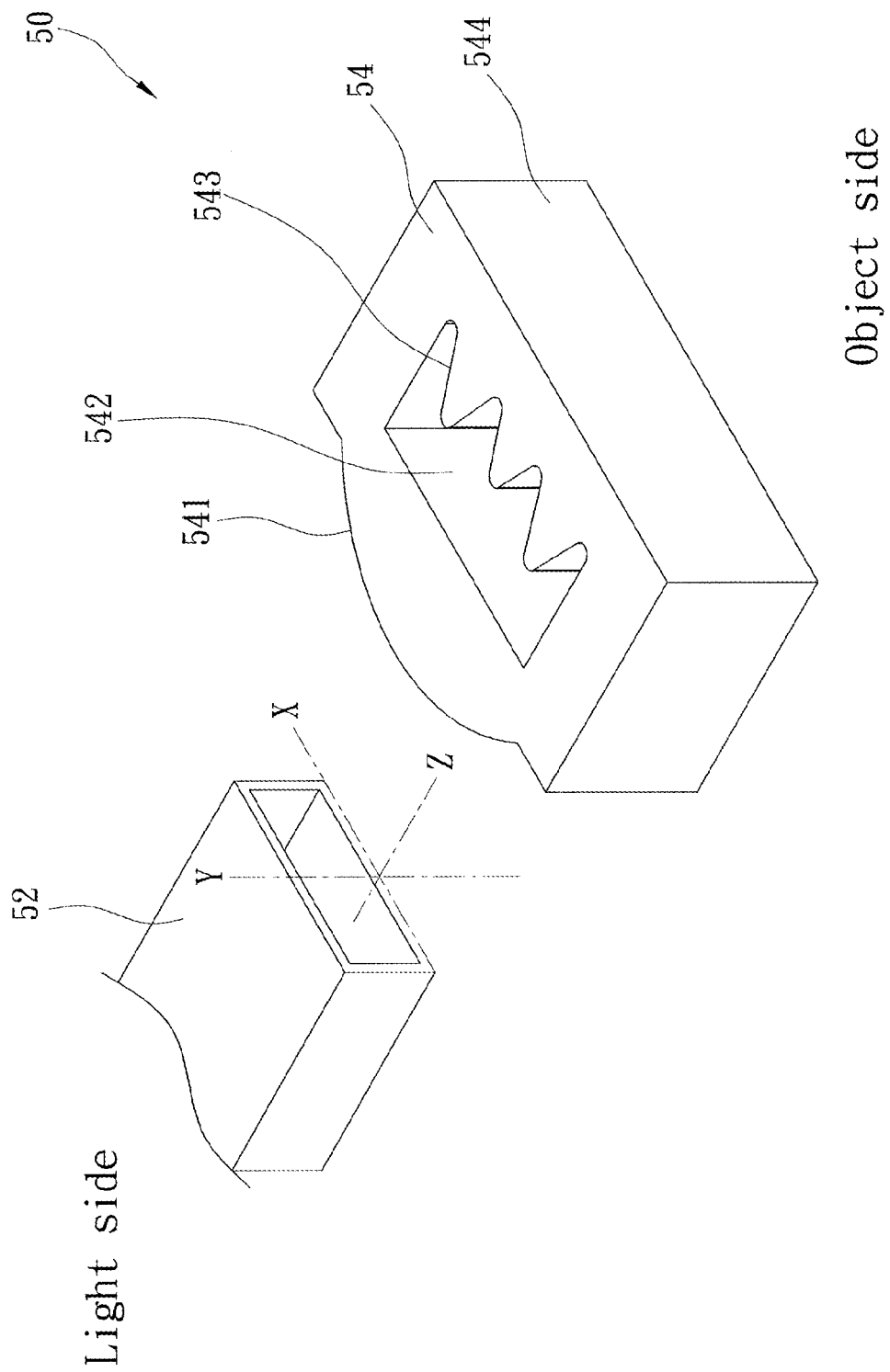
FIG. 10 is a perspective view of the light module of another preferred embodiment of the present invention.

Except the light module 22 as described above, the present invention further provides an alternate light module 50. As shown in FIG. 10, the light module 50 includes, from a light side to an object side, a light source 52 and an optical lens 54. The light source 52 is a laser emitting device in the present invention to emit laser rays toward the object side. The optical lens 54 is a plastic lens made by injection molding. The optical lens 54, from the light side to the object side, has a parallelizing surface 541, a first plane 542, a wave surface 543, and a second plane 544. The parallelizing surface 541 is a convex surface. The wave surface 543 has smooth portions at crests and troughs. The parallelizing surface 541 is formed at an end of the optical lens 54, and the second plane 544 is formed at an opposite end. The optical lens 54 has a cavity at a center thereof to form the first plane 542 and the wave surface 543 at opposite sidewalls of the cavity. Therefore, the laser from the light source 52 enters the optical lens 54 via the parallelizing surface 541 and leaves the optical lens 54 via the first plane 542 (enters the cavity), and then the laser will enter optical lens 54 again via the wave surface 543 and leave the optical lens 54 via the second plane 544.

Figure 11:
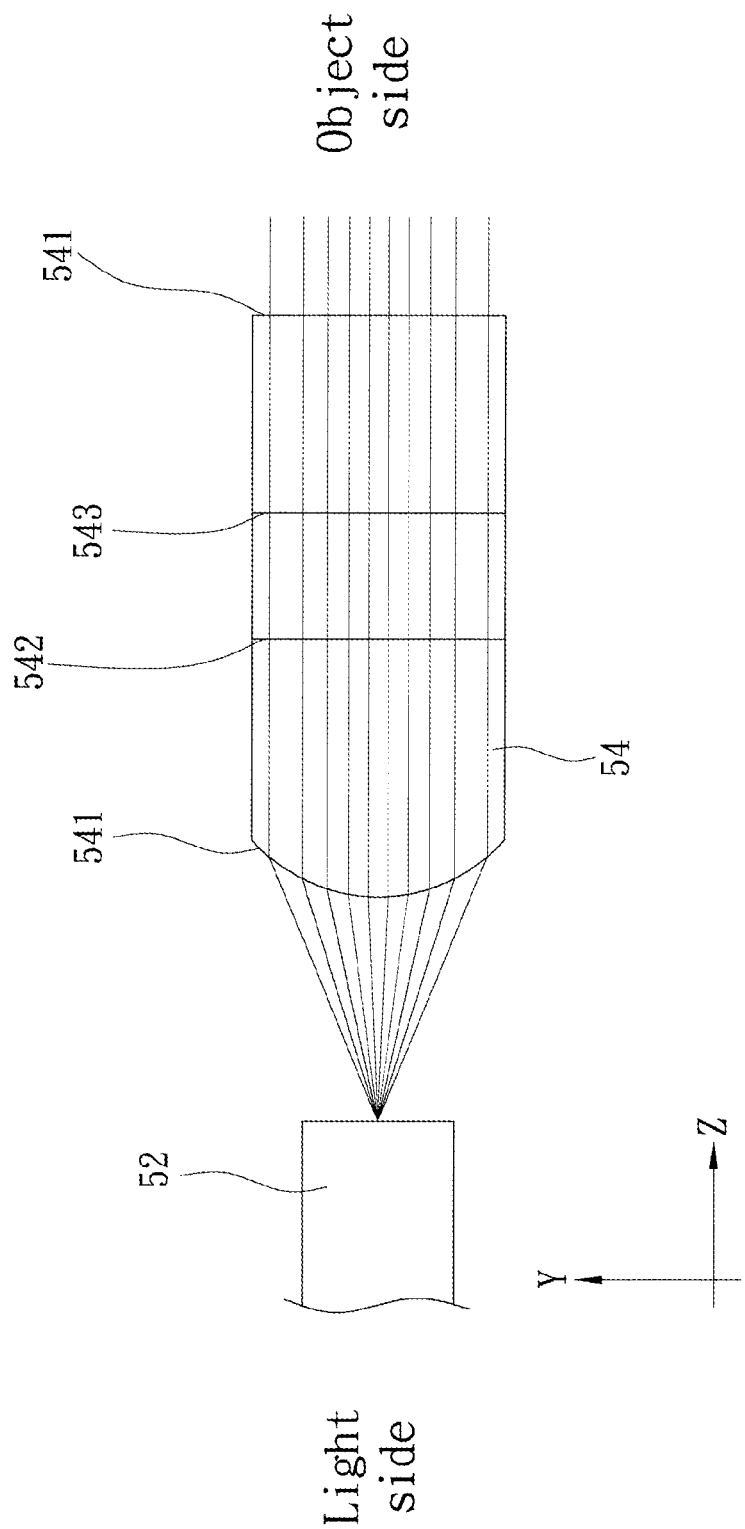
FIG. 11 is a sectional view in Y-Z plane and the light path of FIG. 10.
Figure 12:
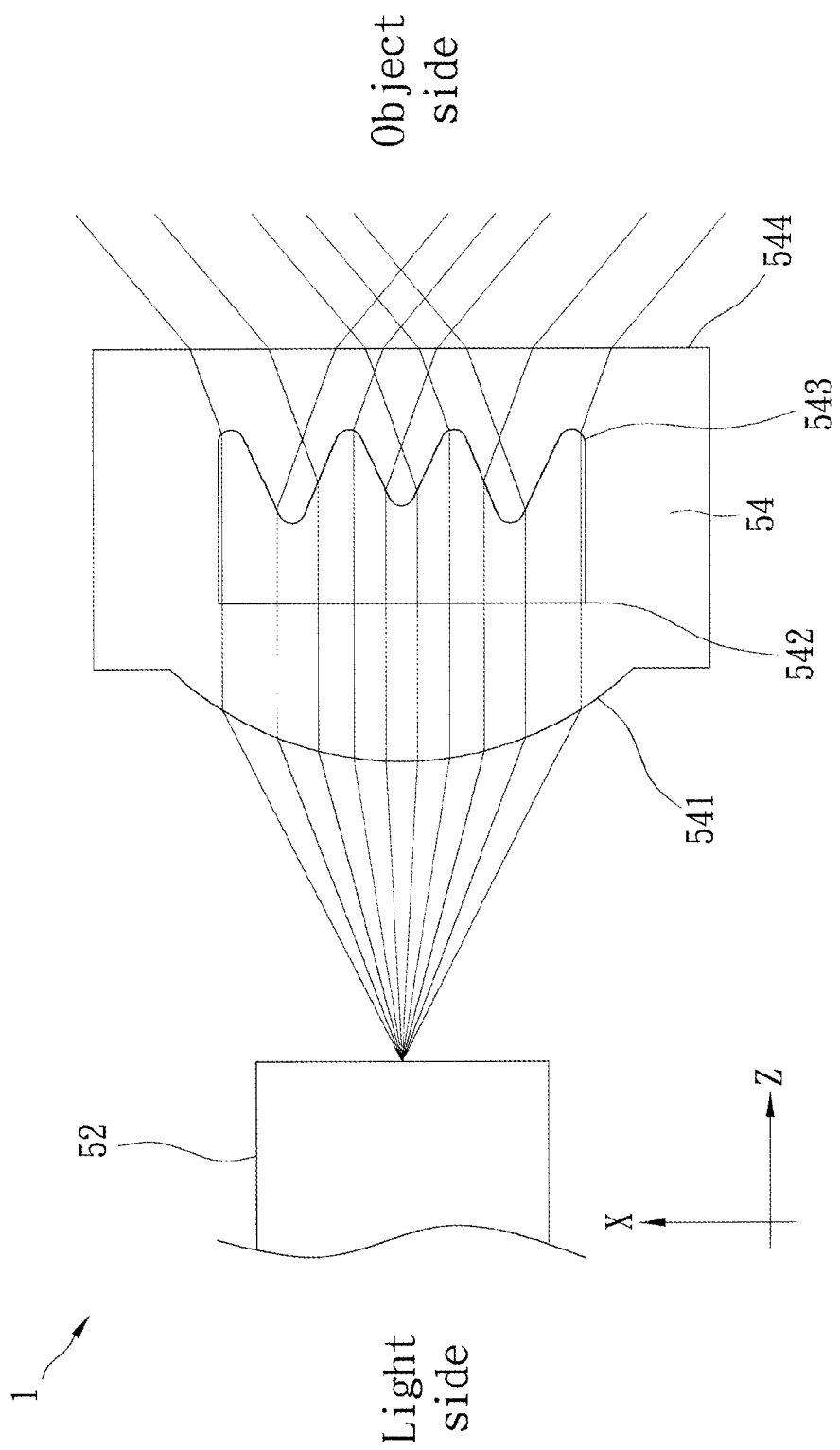
FIG. 12 is a sectional view in X-Z plane and the light path of FIG. 10.
Figure 13:
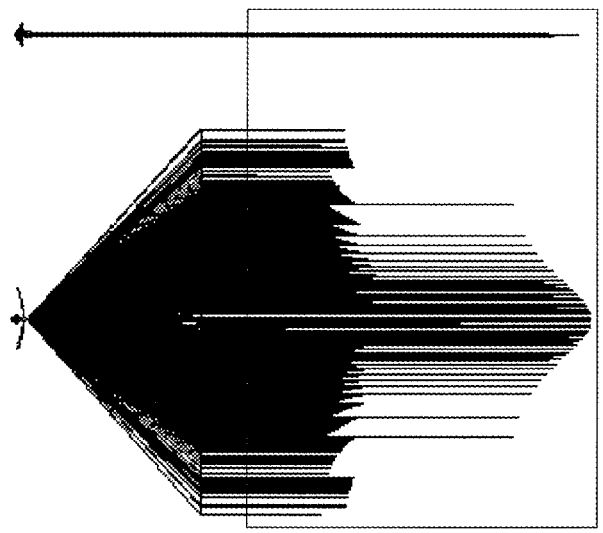
FIG. 13 is an illumination map in three dimensions of the preferred embodiment of the present invention.
Figure 14:
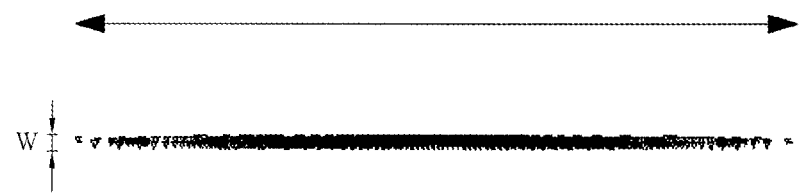
FIG. 14 is a sketch diagram of the shape of the light projected on the object from the preferred embodiment of the present invention.

As shown in FIG. 11 and FIG. 12, when the light source 52 emits laser, the laser will become parallel light when it emits through the parallelizing surface 541 and the first plane 542 and become linear light when it emits through the wave surface 543 and the second plane 544. Besides, the laser will be reflected twice or more when it emits through the parallelizing surface 541, the first plane 542, the wave surface 543, and the second plane 544 that the laser may be diffused to form a diffused, parallel and linear light. Therefore, as shown in FIG. 13, a diffusing angle of the light through the optical lens 54 of the present invention may reach 120 degrees that when the light arrives an object, which is 50 mm away from the light module 50, it is a transverse linear light with a width W between 0.1 mm and 0.5 mm.

In conclusion, the light module 50 of the present invention will speed up the bootup time and reaction time of the photo-sensor type touch device equipped with the light module 50, and the photo-sensor type touch device may be thinner and lighter than the conventional devices, and furthermore, it saves power.

It is noted that any kind of invisible light, except for infrared rays, may be used in the present invention. The way of sensing the invisible light may change also, such as, a plurality of photointerrupters are arranged around the displaying region to sense the invisible light change on the displaying region. The description above is a few preferred embodiments of the present invention. These equivalences of the present invention are still in the scope of claim construction of the present invention.

What is claimed is:

1. A light module, from a light side to an object side, comprising:
    a light source for emitting light toward the object side; and
    an optical lens having a first plane, a parallelizing surface, a wave surface having smooth troughs and crests, and a second plane in sequence from the light side to the object side;
    wherein the light from the light source enters the optical lens via the first plane and leaves the optical lens via the parallelizing surface, and then the light re-enters the optical lens via the wave surface and leaves the optical lens via the second plane to form a linear light;
    wherein the linear light is compressed so as to form a flatly diffused and linear light contained within a thickness of the optical lens in a vertical direction, and an angle between two opposite outermost side edges of the linear light is greater than 90 degrees in a horizontal direction.

2. The light module as defined in claim 1, wherein the light from the light source is converted into a parallel light when it emits through the first plane and the parallelizing surface, and then is converted into a linear light when it emits through the wave surface and the second plane.

3. The light module as defined in claim 1, wherein the wave surface has flat portions at crests and troughs.

4. The light module as defined in claim 1, wherein the parallelizing surface has a convex surface.

5. An optical lens, comprising a first plane, a parallelizing surface, a wave surface having smooth troughs and crests, and a second plane in sequence, wherein the light enters the optical lens via the first plane and leaves the optical lens via the parallelizing surface, and then the light re-enters the optical lens via the wave surface and leaves the optical lens via the second plane to form a linear light; wherein the linear light is compressed so as to form a flatly diffused and linear light contained within a thickness of the optical lens in a vertical direction, and an angle between two opposite outermost side edges of the linear light is greater than 90 degrees in a horizontal direction.

6. The optical lens as defined in claim 5, wherein the light is converted into a parallel light when it emits through the first plane and the parallelizing surface, and then is converted into a linear light when it emits through the wave surface and the second plane.

7. The optical lens as defined in claim 5, wherein the wave surface has flat portions at crests and troughs.

8. The optical lens as defined in claim 5, wherein the parallelizing surface has a convex surface.

* * * * *